US006928617B2

(12) United States Patent
Druyan et al.

(10) Patent No.: US 6,928,617 B2
(45) Date of Patent: Aug. 9, 2005

(54) SEGMENTATION OF VIEWS FOR SIMPLIFIED NAVIGATION ON LIMITED DEVICE

(75) Inventors: Alexander Druyan, Brooklyn, NY (US); Donald A. James, Round Rock, TX (US); Ching Yu Conrad Lo, Saratoga, CA (US); Arsalan K. Lodhi, Long Beach, CA (US); Fabian F. Morgan, Cambridge, MA (US); Sandra Juni Schlosser, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 10/122,022

(22) Filed: Apr. 11, 2002

(65) Prior Publication Data

US 2004/0017391 A1 Jan. 29, 2004

(51) Int. Cl.[7] .................................................. G06F 3/00
(52) U.S. Cl. ....................... 715/760; 715/864; 715/765; 715/513
(58) Field of Search ................................. 715/760, 788, 715/501, 517, 864, 748, 764, 765, 513, 509, 503

(56) References Cited

U.S. PATENT DOCUMENTS

| 5,526,481 | A | | 6/1996 | Parks et al. ................. 395/155 |
|---|---|---|---|---|
| 5,714,972 | A | | 2/1998 | Tanaka et al. .............. 345/121 |
| 5,966,716 | A | * | 10/1999 | Comer et al. ............... 707/203 |
| 6,016,110 | A | | 1/2000 | Takinami .................... 340/995 |
| 6,023,714 | A | * | 2/2000 | Hill et al. ................... 715/513 |
| 6,246,989 | B1 | | 6/2001 | Polcyn ....................... 704/275 |
| 6,405,221 | B1 | * | 6/2002 | Levine et al. ............ 715/501.1 |
| 2001/0005203 | A1 | * | 6/2001 | Wiernik ....................... 345/302 |
| 2001/0018654 | A1 | * | 8/2001 | Hon et al. ................... 704/257 |
| 2002/0129067 | A1 | * | 9/2002 | Dames et al. ............... 707/523 |
| 2002/0140571 | A1 | * | 10/2002 | Hayes et al. ........... 340/825.72 |
| 2003/0069881 | A1 | * | 4/2003 | Huttunen ....................... 707/5 |
| 2003/0229529 | A1 | * | 12/2003 | Mui et al. ...................... 705/8 |

OTHER PUBLICATIONS

Fred O'Bryant, Cascading Style Sheet, Jun. 1999, p. 1–14.*

* cited by examiner

*Primary Examiner*—Raymond J. Bayerl
(74) *Attorney, Agent, or Firm*—David A. Mims, Jr.; Anthony V.S. England

(57) ABSTRACT

In one form, a method, for creating multiple segments of source information for presentation on a device having a limited size display screen, includes generating a first derivative file describing first presentation material. The derivative file is derived from a first copy of a master style sheet file. The master style sheet file specifies a style of displaying the source information. The source information includes a plurality of attributes, of which a first set of attributes are included in the first derivative style sheet file. A second derivative file describing second presentation material is derived from a second copy of the master style sheet file. A second set of attributes included in the source information are included in the second derivative file. The first presentation and second presentation materials are generated responsive to the source information and the respective first and second derivative files.

12 Claims, 9 Drawing Sheets

FIG. 1 (PRIOR ART)

| Problem # | Grp. User | Location | Contact |
|---|---|---|---|
| 00004706 | LAN Network DAJAMES | B903 Austin, TX | Sherry Smith IBM IGS |
| 00006569 | LAN Network DAJAMES | B903 Austin, TX | Terry Krause IBM IGS |
| 00006571 | LAN Network DAJAMES | B904 Austin, TX | Liz Wallace Tivoli |

⇦ PREVIOUS   Page 2 of 3   NEXT ⇨

FIG. 5B

SEGMENTATION OF VIEWS FOR SIMPLIFIED NAVIGATION ON LIMITED DEVICE

BACKGROUND OF THE INVENTION

1. Field of the Invention

The present invention relates to displaying information on a display screen, and more particularly to a web-browsing navigational tool for handheld computerized devices.

2. Related Art

With the advent of the Internet, it is increasingly common to display information, particularly Internet web pages, with connected, limited devices ("CLD's") that are highly portable, and therefore limited in size and computational power. Typical examples of CLD's include small, handheld computerized devices such as a personal digital assistant ("PDA") with or without built-in communication function, cellular telephone, and two-way pagers. Due to size and battery power constraints, the processor included in a CLD typically provides less computational power than a desktop computer, and therefore has limited resources for performing tasks such as processing instructions, and displaying information. Of course, the display screen for a CLD is typically smaller than the size of a desktop computer display screen. Therefore there is an increasing need to efficiently utilize the limited resources available to a CLD. Additionally, it may be desirable to provide a web-browsing tool for the small sized display screen of a CLD to navigate and display information efficiently in response to user inputs.

Referring to FIG. 1, information 100 is shown, displayed in a single view, generated by a conventional web browser for a desktop display screen 105. According to prior art, a display screen 110, for a CLD 190, is also shown, displaying a portion 112 of information 100 displayed on display screen 105. Horizontal scroll bar 115 and vertical scroll bar 120 are used to control the relative position of display screen 110 within information 100. While it is possible to view all of information 100 on display screen 110 by moving small display screen 110 around within information 100, this arrangement is nevertheless problematic. For example, it may be difficult to correlate a first piece of information 100 displayed with in display screen 110 in a first position with another piece of information 100 located several rows and/or columns away that is displayed with in display screen 110 in a second position.

The World Wide Web Consortium ("W3C") has developed standards for the world wide web ("WWW") that promote further evolution of the WWW and ensure interoperability. W3C standards such as Extensible Markup Language ("XML"), Extensible Stylesheet Language ("XSL") and XSL transformations ("XSLT") are well known for generating information displayed by a browser.

As stated above, it is common to display information, such as information 100, in a web page format. Referring to FIG. 2, aspects of such formatting are illustrated, according to prior art. As shown in FIG. 2, an XSLT processor 220 adds styling information in the form of an XSLT style sheet file 230 to an XML source document 210, transforming source document 210 into a resulting HTML document 240. Alternatively, the resulting document 240 may be prepared by using other presentation-oriented formats such as XHTML, PDF or scalable vector graphics ("SVG"). Although referred to as a "processor", XSLT processor 220 is a software program.

From the above it should be appreciated that there is an increasing need to format information for presentation on a device having a limited display size, and that it is particularly useful to do so in a manner that conforms to browser-related standards.

SUMMARY OF THE INVENTION

The forgoing need is addressed by the present invention, according to one aspect of which a method is provided for creating multiple segments of source information for presentation on a device having a limited size display screen. The method includes generating a first derivative style sheet file describing first presentation material. The first derivative style sheet file is derived from a first copy of a master style sheet file. The master style sheet specifies a style of displaying the source information. The source information specified by the master style sheet exceeds an amount which the limited size display screen is capable of displaying in one view. The source information includes a plurality of attributes, out of which a first set of attributes are included in the first derivative style sheet file. A second derivative style sheet file describing second presentation material is derived from a second copy of the master style sheet file. A second set of attributes included in the source information are included in the second derivative style sheet file. The first presentation material is generated responsive to the source information and the first derivative style sheet file. The second presentation material is generated responsive to the source information and the second derivative style sheet file.

In another aspect, the source information specified by the master style sheet exceeds an amount of information capable of being displayed by the device in a single view. The source information includes a first segment of information associated with the first set of attributes and a second segment of information associated with the second set of attributes. The first presentation material is for generating a first view the first segment on the device and the second presentation material is for generating a second view of the second segment on the device. The device is capable of concurrently displaying, in the first view, all of the first segment of information, and is capable of concurrently displaying, in the second view, all of the second segment of information.

Additional aspects, objects, advantages and other forms of the invention will become apparent upon reading the following detailed description and upon reference to the accompanying drawings.

BRIEF DESCRIPTION OF THE DRAWINGS

FIG. 1, described above, is a web browser generated display, suitable for viewing on a large display screen, according to the prior art.

FIGS. 5A, 5B and 5C illustrate a series of optimized web pages, according to an embodiment of the present invention.

DETAILED DESCRIPTION OF A PREFERRED EMBODIMENT

The claims at the end of this application set out novel features which applicant believes are characteristic of the invention. The invention, a preferred mode of use, objectives and advantages, will best be understood by reference to the following detailed description of an illustrative embodiment read in conjunction with the accompanying drawings.

Figure 3:
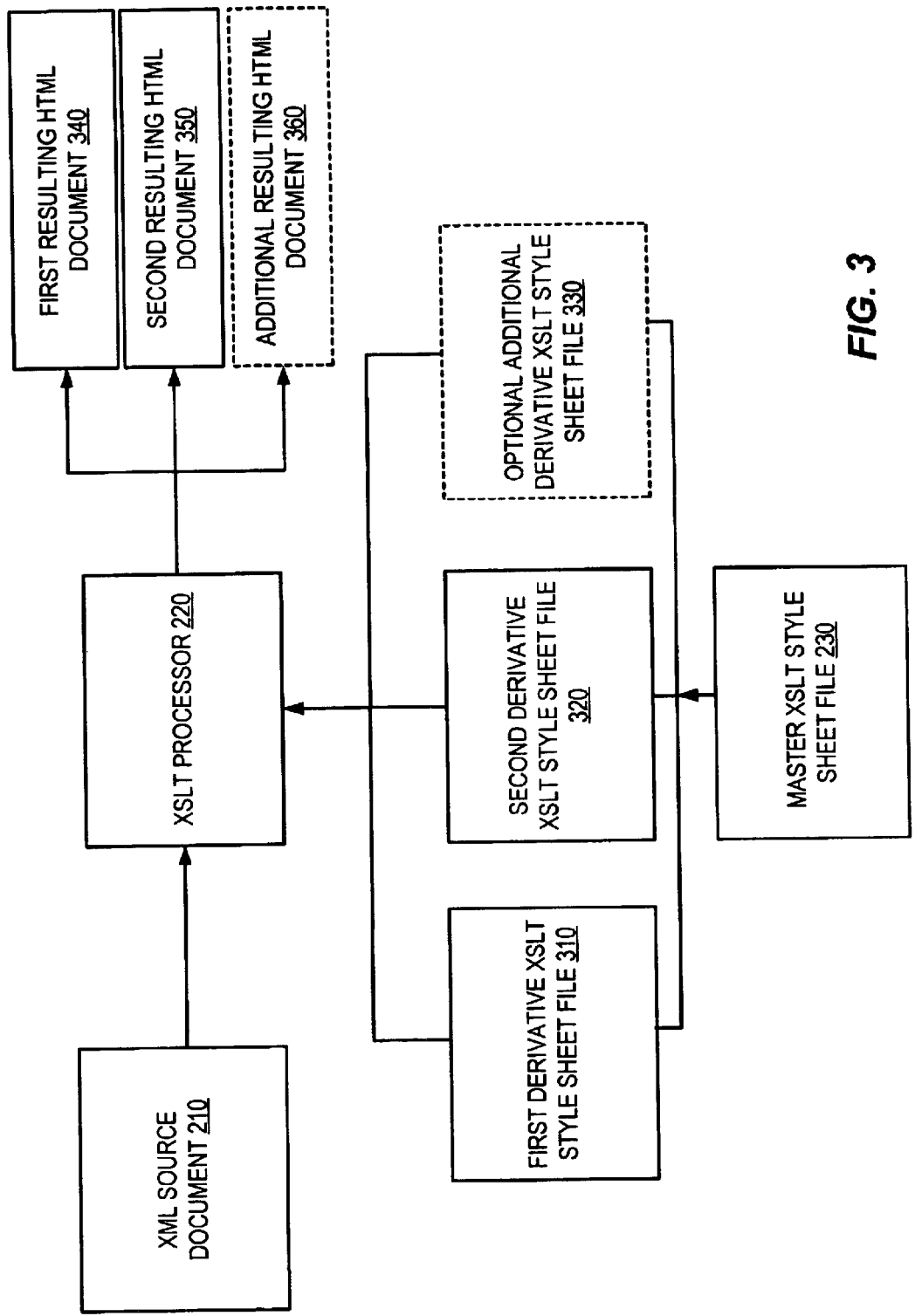
FIG. 3 is a block diagram for generating a web display for a CLD having small display screen, according to an embodiment of the present invention.

Referring to FIG. 3, a block diagram is shown illustrating aspects of displaying information on a CLD having a display screen of limited size, in accordance with an embodiment of the present invention. In the embodiment, the CLD is enabled to perform web browsing. That is, a user is able to view portions of information 100 (FIG. 1) formatted as HTML documents using a web browser program running on the CLD.

Figure 1:
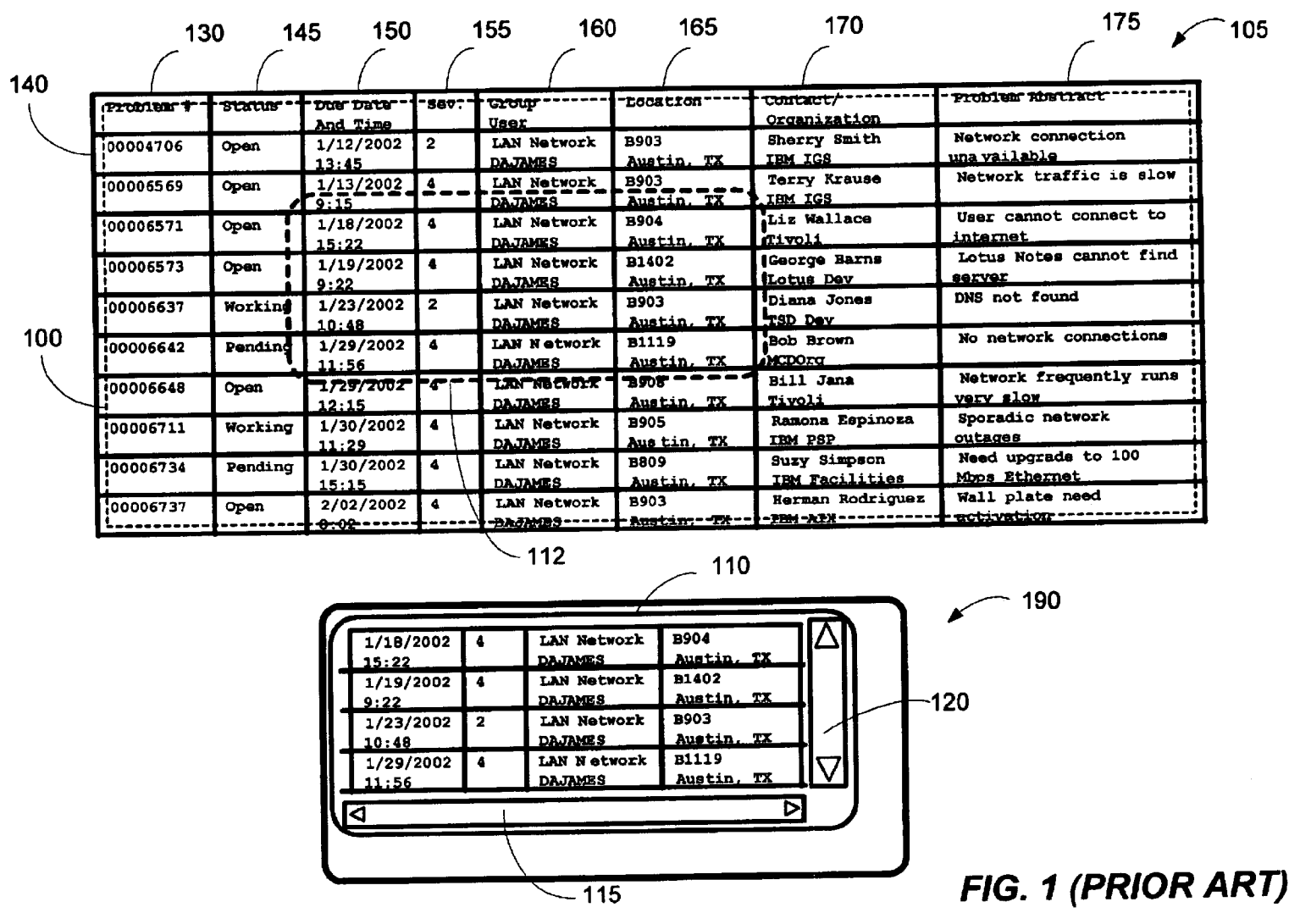

Referring to FIG. 1, for example, a CLD user may wish to access a remote web server to retrieve a service request record 140 from a database of information 100. Service request record 140 may be defined to include relevant data and/or information describing a service request. In the illustrated example, each service request record 140 has the following attributes: unique problem number 130, status 145, due date and time 150, severity 155, group user 160, location 165, contact/company 170 and problem description 175. Unique problem number 130 attribute may also be described as a primary key to access the database.

Figure 2:
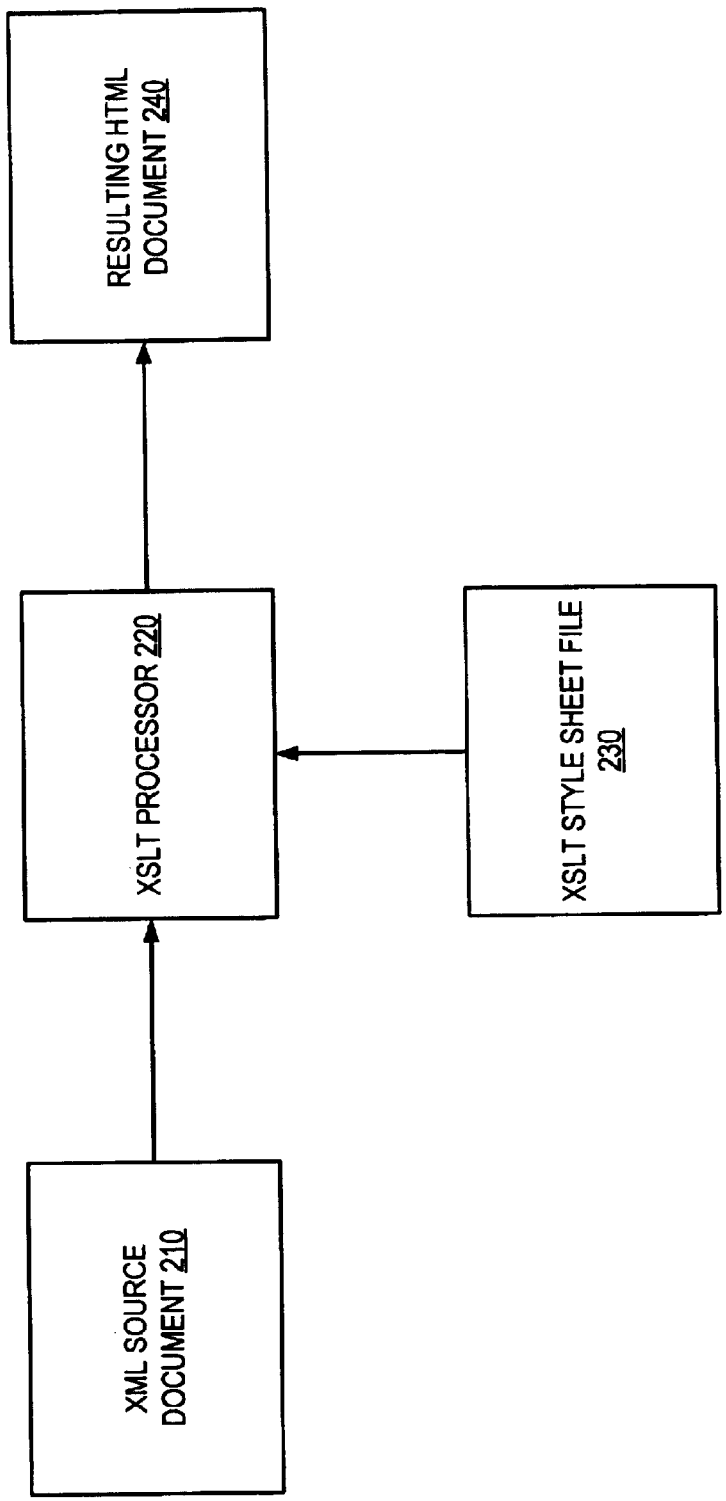
FIG. 2, described above, is a block diagram illustrating a method to generate a web display using XML and XSLT standards, according to the prior art.

Referring back to FIG. 3, in the embodiment information 100 (FIG. 1) is segmented into multiple views. The number of views may be configured based on design considerations such as size of CLD display screen 110 (FIG. 1). In this embodiment, a first derivative XSLT style sheet file 310, a second derivative XSLT style sheet file 320 and an optional additional derivative XSLT style sheet 330 are derived from a master (also known as a "parent") XSLT style sheet file 230 (FIG. 2) describing information 100. The process of deriving a derivative (also known as a "child") style sheet from a master style sheet may be implemented manually or may be automated by a computer program, and will be further described in connection with FIG. 4 below.

XML source document 210 provides source information, e.g., information 100, which typically includes a number of tagged attributes. For example, information 100 includes information having a number of tagged attributes such as in FIG. 1—problem number 130, status 145, and due date 150 described in service request record 140.

In one aspect, master XSLT style sheet file 230 specifies the styling and/or the layout of the HTML document 240 (FIG. 2), including information 100, optimized for display by a web browser on the display screen 105 (FIG. 1) of a desktop computer. Accordingly, the information specified by the master XSLT style sheet file 230 exceeds an amount which the CLD display screen 110 is capable of displaying in one view. To optimize for the CLD display screen 110, the information from the source document 210 is segmented by processor 220, responsive to style sheets 310, 320 and 330, into HTML documents 340, 350 and 360, which are optimized for viewing on the CLD display screen 110. This advantageously provides improved navigation. It also conserves bandwidth, i.e., for downloading data to the CLD.

Figure 4:
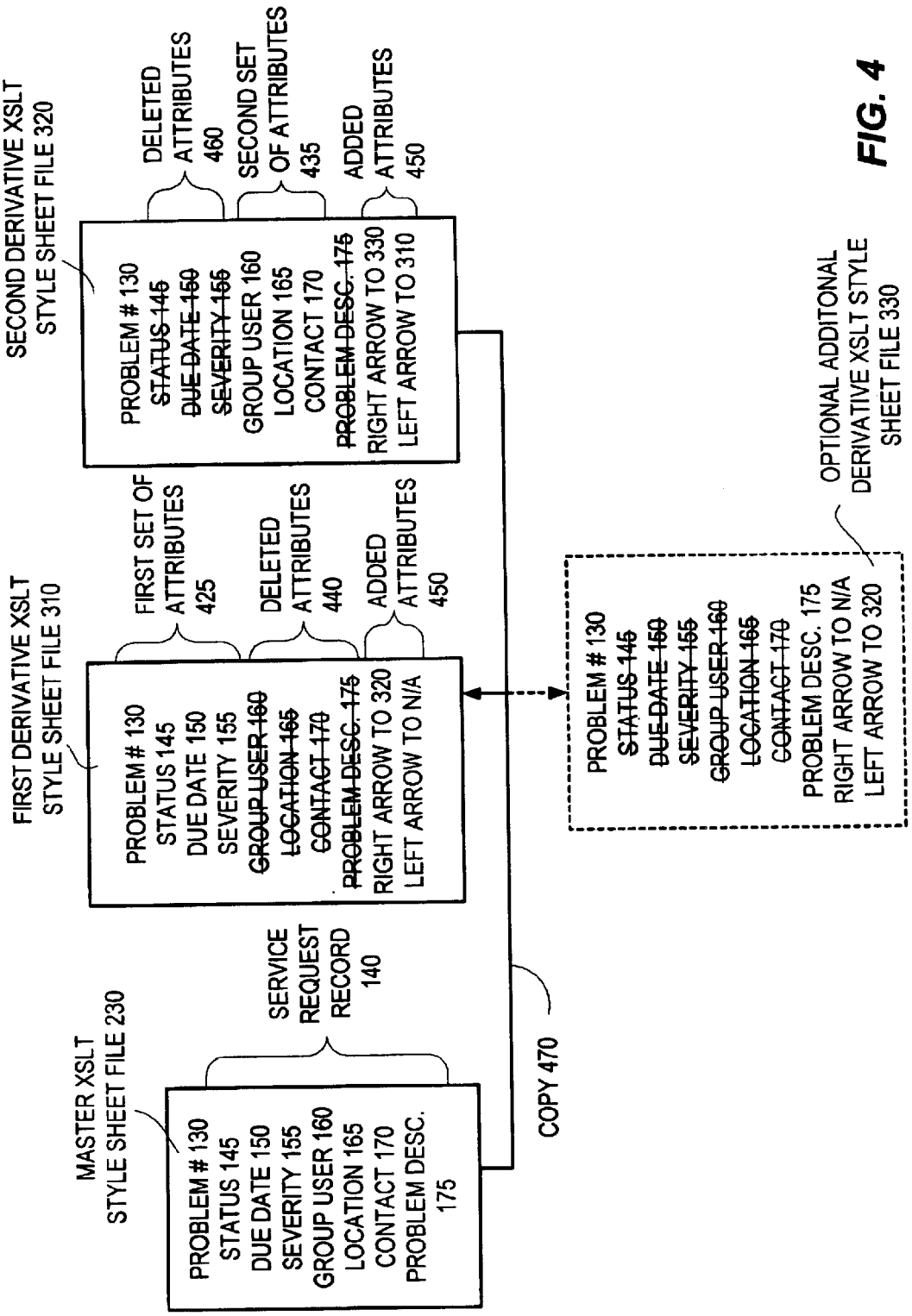
FIG. 4 is a block diagram for deriving a derivative style sheet from a master style sheet, according to an embodiment of the present invention.

Referring to FIG. 4, in one embodiment, the process of deriving a derivative style sheet includes making a number of copies 470 of the master XSLT style sheet file 230. First derivative XSLT style sheet file 310 is generated from a first one of the copies 470 of master XSLT style sheet file 230, and specifies a first set of attributes 425 which is associated with a first portion (or segment) of the source information. Likewise, second derivative XSLT style sheet 320, is generated from a second one of the copies of master XSLT style sheet file 230, and specifies a second set of attributes 435 associated with a second portion of the source information. Of course, additional derivative XSLT style sheets, such as style sheet 330 may be generated from additional copies of the master style sheet, as shown in the embodiment.

As previously stated, the source information from source document 210 and the derivative style sheets 310, etc. are processed with XSLT processor 220, which generates respective presentation-style, e.g., HTML, documents 340, 350, etc. for generating respective views of the information portions on the CLD. Note that the CLD is capable of concurrently displaying the entire first portion of the information, i.e., information specified by the first style sheet 310, on display screen 110 in the first view, the entire second portion in the second view, etc.

The process of generating first derivative XSLT style sheet file 310 includes deleting one set of the attributes 440 from the first copy of the master style sheet and adding a link attribute 450 referring to the second derivative XSLT style sheet 320, so that the first view on display screen 110 includes a link for navigating from the first portion of the information to the second portion of the information. Likewise, the process of generating second derivative XSLT style sheet 320 includes deleting a second set of the attributes 460 from the second copy of the master style sheet and adding link attributes 450 referring to first and third derivative XSLT style sheets 310 and 330 so that the view on display screen 110 of the second portion of the information includes links for navigating from the second view to the first and third views.

Note that the two views associated with style sheets 310 and 320 have some information in common and some disparate information. That is, a certain key one of the attributes, problem #130, is included in both the first and second segments of the information, i.e., is not deleted in either copy of master XSLT style sheet 230, so that CLD displays the information for this key attribute in both the first and second views. This provides some context for the user tying the two views together. Note also that some of the attributes 440, which are deleted in the process of generating first derivative XSLT style sheet 310, are included among attributes for second derivative XSLT style sheet 320. Likewise, some of the attributes 460, which are deleted in the process of generating second derivative XSLT style sheet 320, are included among attributes for first derivative XSLT style sheet 310, so that the first and second views include some disparate information, i.e., information that is not in common between the two views.

Figure 5A:
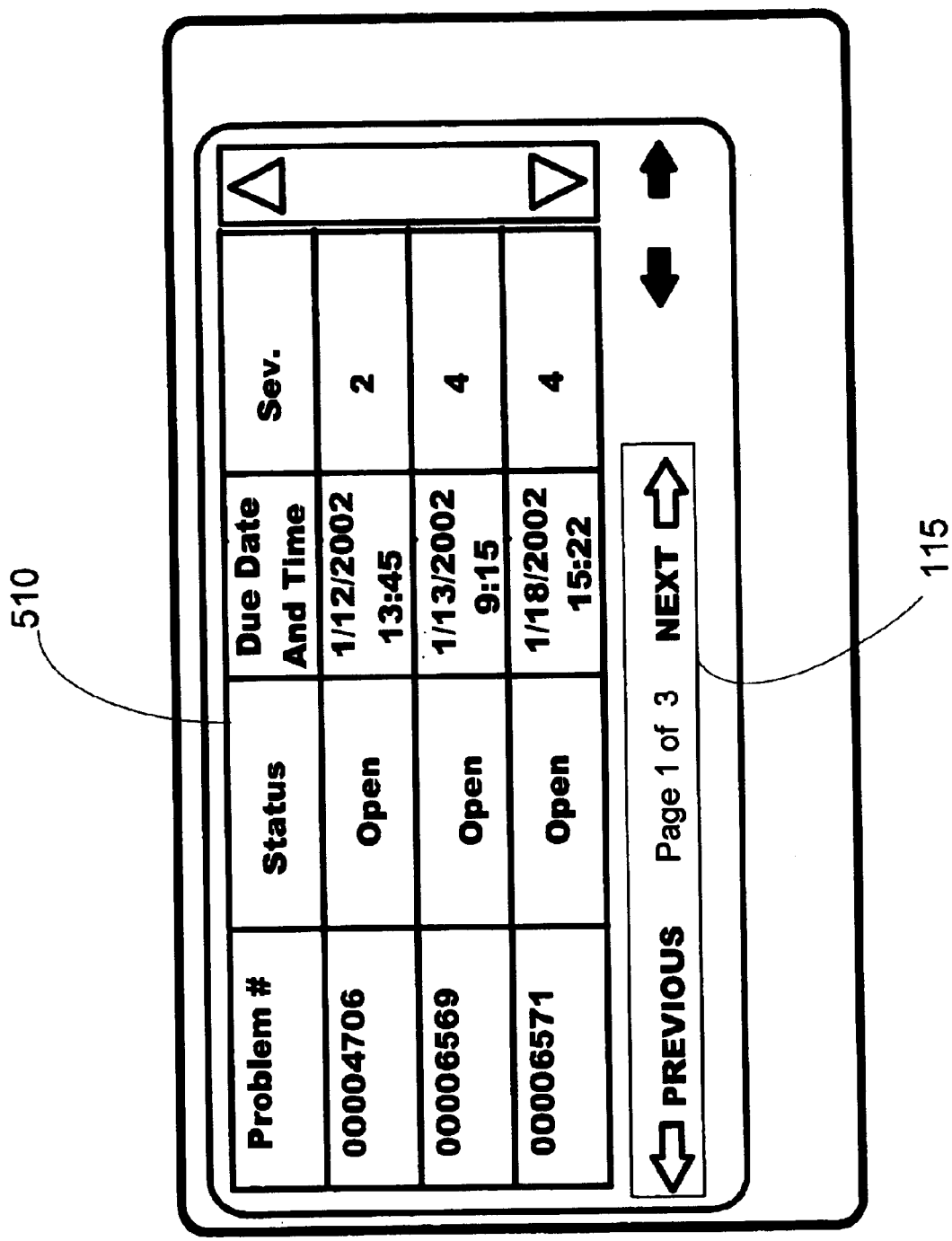
Figure 5C:
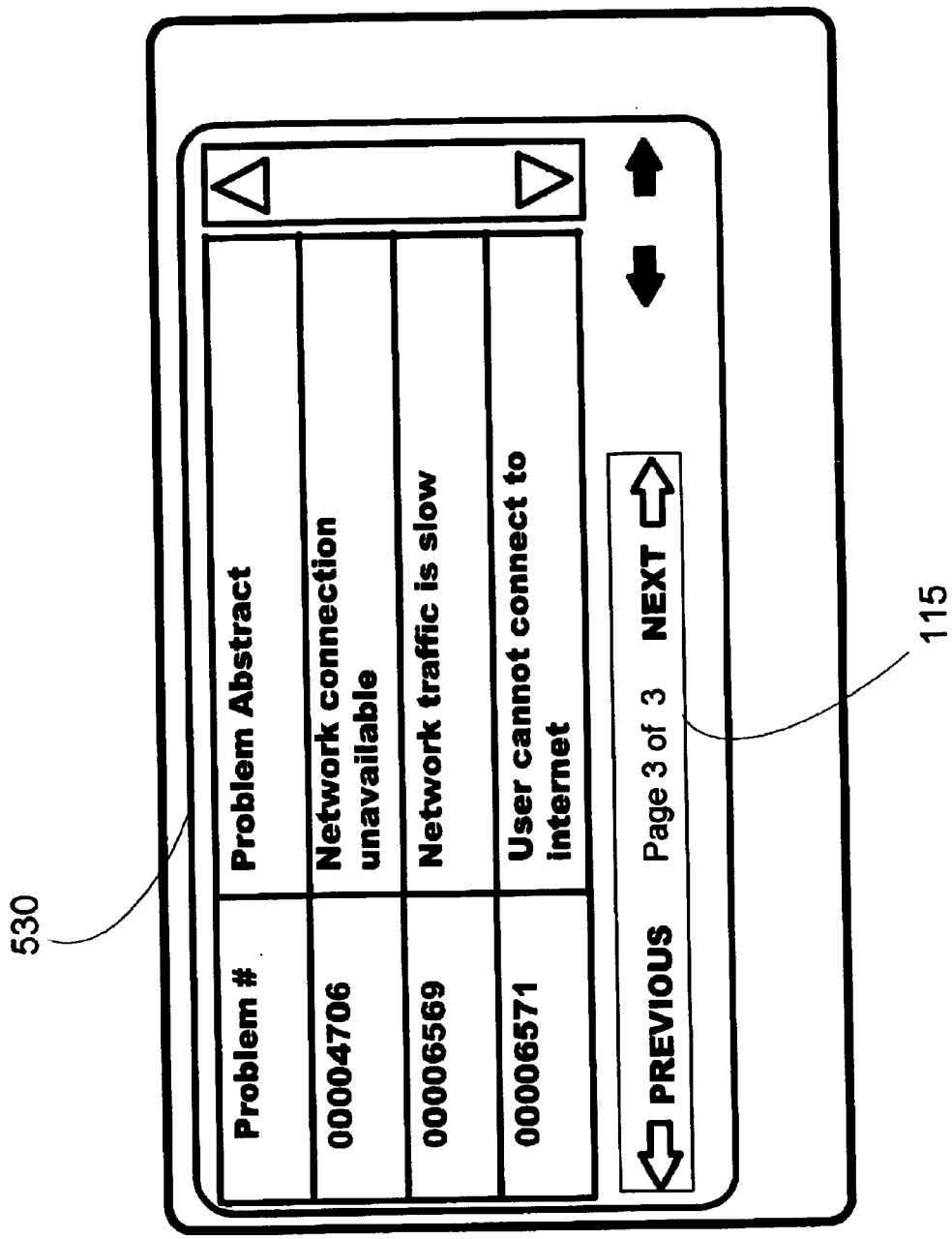

Referring now to FIGS. 5A, 5B and 5C, a series of optimized web page displays are illustrated, according to an embodiment. Navigation among the displays is responsive to receiving scroll commands, as will be explained. Referring first to FIG. 5A, HTML document 340 (FIGS. 3 and 4) is displayed on CLD display screen 110 in first view 510. Included in first view 510 is a portion of the information 100 (FIG. 1). That is, a portion of the information 100 associated with the first set of attributes 425 (FIG. 4) is displayed in view 510. This includes values for the attribute which each view has in common, i.e., the problem number, e.g., "00004706." It also includes values for each of the attributes 425 (FIG. 4), i.e., status, date and severity.

For navigational purposes, first view 510 also includes a current page number and a total number of pages, i.e., "page 1 of 3." The view 510 also includes the link 450 (FIG. 4). In response to a CLD user clicking on a "forward," i.e., "next," arrow of the horizontal scroll bar 115, the link attribute 450 (FIG. 4) is activated, calling up second view 520. The "previous" arrow does not have a link in the first view 510.

Referring to FIG. 5B, in response to the link 450 being activated from the first view 510 (FIG. 5A), HTML document 350 is displayed on the CLD display screen 110 in the second view 520. This view 520 does not show status, date and severity attributes which were included in first view 510. Likewise, the second set of attributes 435 (FIG. 4), which includes group user, location and contact, is displayed in the second view 520, but not in the first view 510.

Once again, in the second view 520 for navigational purposes the value for the current page number and of total number of pages is displayed, i.e., "page 2 of 3." The second view 520 includes links 450 (FIG. 4) to the first and third views. In response to a CLD user clicking on the "next" arrow, one of the link attributes 450 (FIG. 4) to style sheet 330 (FIGS. 3 and 4) is activated, calling up the third view 530. In response to a CLD user clicking on the "previous" arrow, one of the link attributes 450 (FIG. 4) to style sheet 310 (FIGS. 3 and 4) is activated, calling up the first view 510.

Referring to FIG. 5C, in response to the link 450 being activated from the second view 520 (FIG. 5B), HTML document 360 is displayed on the CLD display screen 110 in the second view 530. In this view 530, a third set of attributes previously not displayed in first view 510 or second view 520 are displayed along with the attributes common to the first and second views 510 and 520. For navigational purposes, in the third view 530 the value for the current page number and total number of pages is displayed, i.e., "page 3 of 3." The view 530 also includes the link 450 (FIG. 4) associated with the "previous" arrow to go back to the second view 520.

Figure 6:
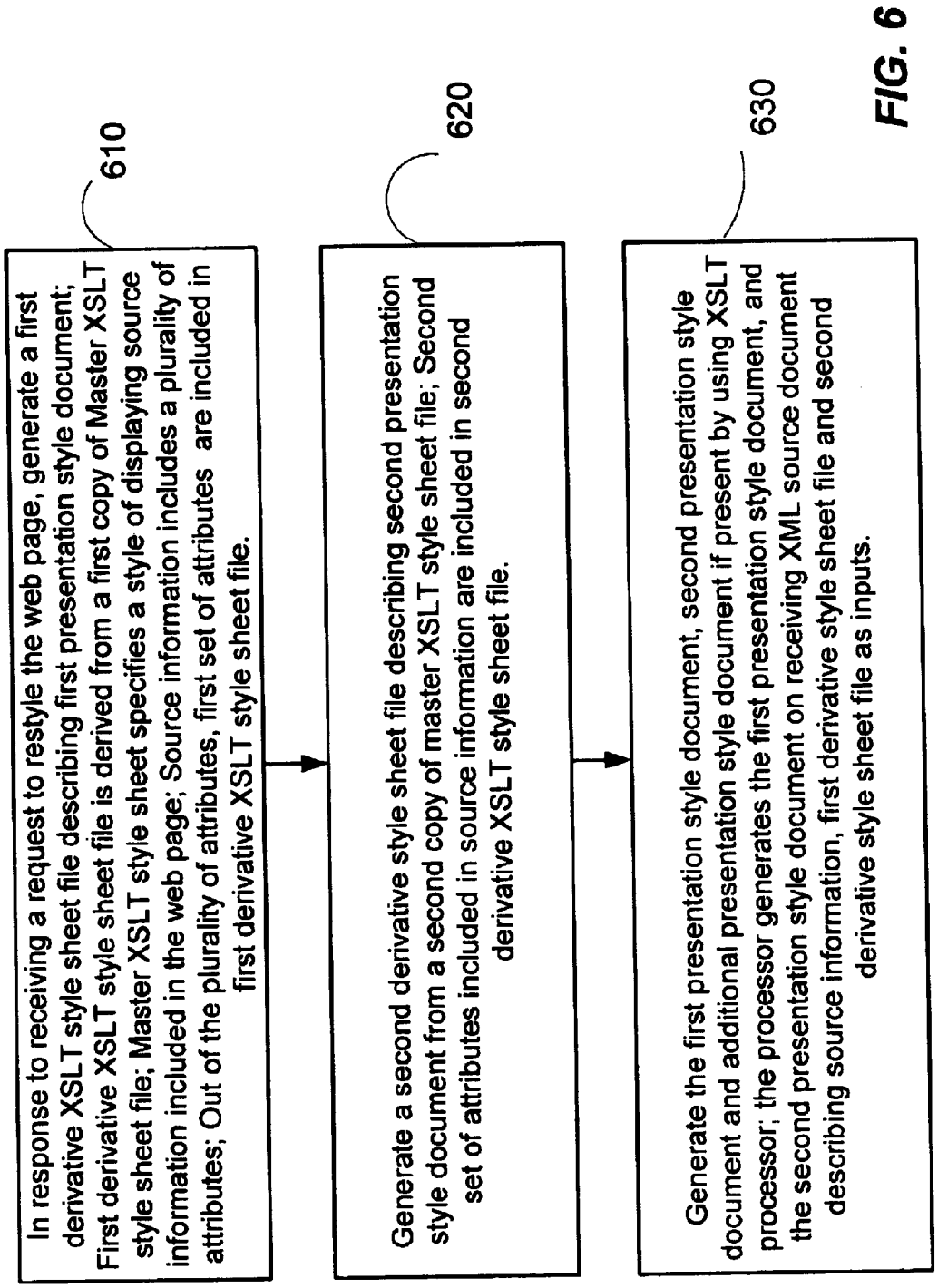
FIG. 6 is a flow chart illustrating a method for restyling a web page to an optimized web page is shown.

Referring to FIG. 6, a flow chart illustrating a method for restyling a web page to an optimized web page is shown. In this embodiment, the web page prepared for display on desktop display screen 105 is used as an input to generate optimized web pages suitable for display on a CLD having display screen 110.

In step 610, in response to receiving a request to restyle the web page, first derivative XSLT style sheet file 310 describing first presentation style document 340 is generated. First derivative XSLT style sheet file 310 is derived from a first copy of Master XSLT style sheet file 230. Master XSLT style sheet 230 specifies a style of displaying information 100 included in the web page. Information 100 includes a plurality of attributes, e.g., unique problem number 130, status 145, due date and time 150, severity 155, group user 160, location 165, contact/company 170 and problem description 175. Out of the plurality of attributes, first set of attributes 425 are included in first derivative XSLT style sheet file 310.

In step 620, second derivative style sheet file 320 describing second presentation style document 350 is derived from a second copy of master XSLT style sheet file 230. Second set of attributes 435 included in information 100 are included in second derivative XSLT style sheet file 320.

In step 630, first presentation style document 340 and second presentation style document 350 are generated by XSLT processor 220 on receiving XML source document 210 describing information 100, first derivative style sheet file 310 and second derivative style sheet file 320 as inputs.

Figure 7:
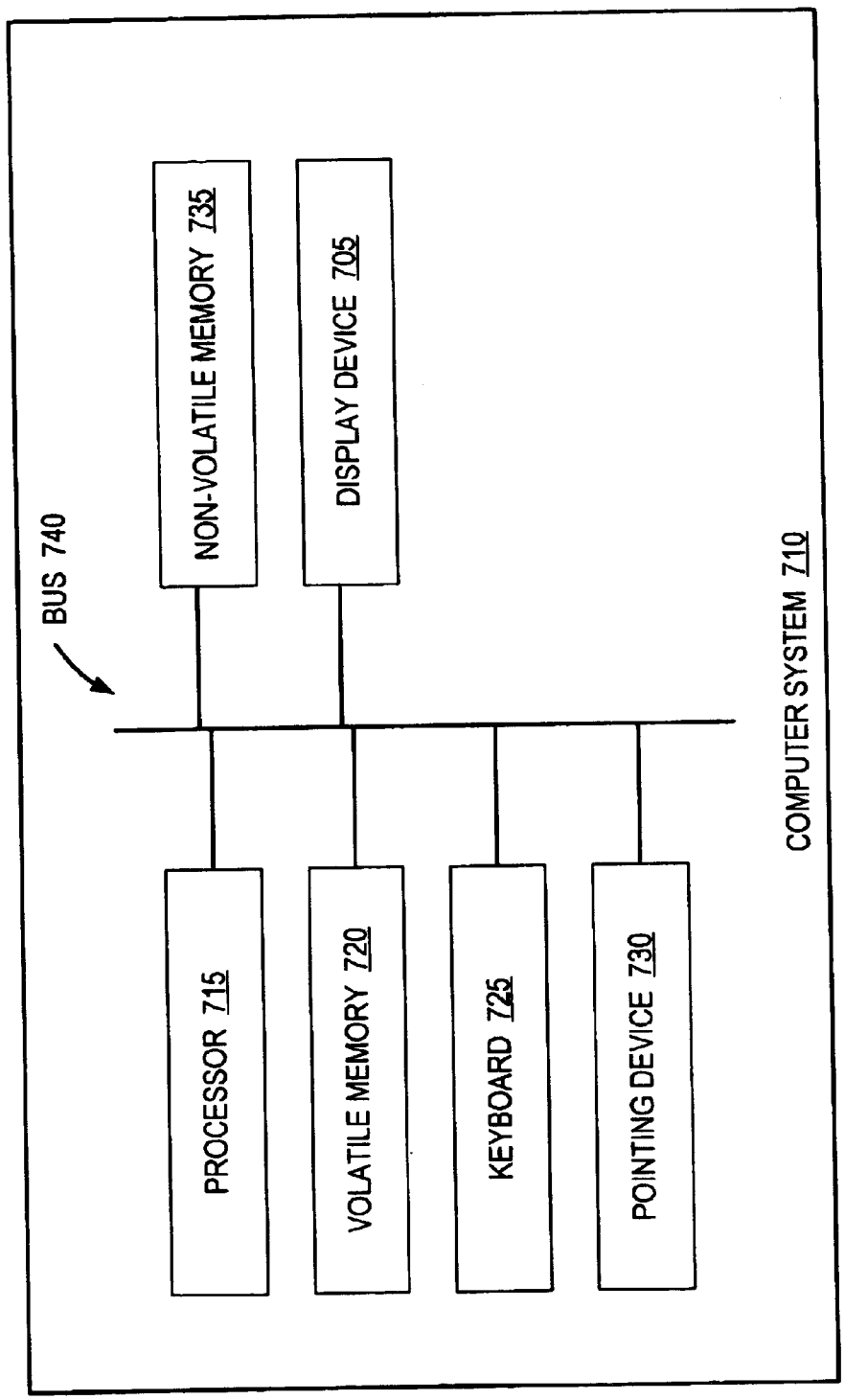
FIG. 7 illustrates a computerized device to implement method or apparatus aspects of the present invention, according to an embodiment.

Referring to FIG. 7, a computer system 710 is shown that is generally applicable for the various embodiment described according to the present invention. The system 710 includes a processor 715, a volatile memory 720, e.g., RAM, a keyboard 725, a pointing device 730, e.g., a mouse, a nonvolatile memory 735, e.g., ROM, hard disk, floppy disk, CD-ROM, and DVD, and a display device 705 having a display screen. Memory 720 and 735 are for storing a program instructions which are executable by processor 715 to implement various embodiments of a method in accordance with the present invention. Components included in system 710 are interconnected by bus 740. A communications device (not shown) may also be connected to bus 740 to enable information exchange between system 710 and other devices.

In various embodiments system 710 takes a variety of forms, including a personal computer system, mainframe computer system, workstation, Internet appliance, PDA, an embedded processor with memory, etc. That is, it should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C++ objects, Java and Microsoft Foundation Classes (MFC).

It should also be understood from the foregoing that in various embodiments the method for publishing a web page optimized for a device having a limited display screen is implemented in a variety of programming languages, such as XML and XSLT. In one embodiment, the method uses Java Server Pages ("JSP"), and, accordingly, a Java processor receives one or more .jsp style sheet files to generate HTML displays. In one embodiment, the method uses Visual Basic programming language.

The description of the present embodiments have been presented for purposes of illustration, but are not intended to be exhaustive or to limit the invention to the forms disclosed. Many additional aspects, modifications and variations are also contemplated and are intended to be encompassed within the scope of the following claims. For example, while certain aspects of the present invention have been described in the context of a fully functioning data processing system, those of ordinary skill in the art will appreciate that the processes of the present invention are capable of being distributed in the form of a computer readable medium of instructions in a variety of forms. The present invention applies equally regardless of the particular type of signal bearing media actually used to carry out the distribution. Examples of computer readable media include RAM, flash memory, recordable-type media such as a floppy disk, a hard disk drive, a ROM, CD-ROM, DVD and transmission-type media such as digital and/or analog communication links, e.g., the Internet.

Although the embodiment described above has first and second documents 340 and 350 for producing corresponding first and second views on the limited device, as shown in FIGS. 3, 5A and 5B, in an alternative, one document is produced having at least two frames. For example, frames are typically configured in a web display by using <FRAMESET>, </FRAMESET> commands. In this single-document embodiment, a first frame that is vertically scrollable but not horizontally scrollable displays problem number 130 (FIGS. 1, 5A, 5B and 5C). A second frame that is vertically scrollable in coordination with the first frame displays, and is also horizontally scrollable, displays additional attributes of service request records corresponding to the respectively displayed problem numbers. Accordingly, the terms "first presentation material" and "second presentation material" are used herein to refer to first and second documents for generating first and second views on the CLD, as in the first embodiment, and also to refer to a single document with the first and second frames, as in the single-document embodiment. Thus, for the single-document embodiment, "first presentation material" refers to the document with the first frame and a first instance of the second frame, and "second presentation material" refers to the document with the first frame and a second instance of the second frame.

Although certain aspects of the present invention have been described in the context of application to a "connected, limited device," implying that the device is connected to a computer or network of computers, it should be understood that the invention applies equally to devices having limited size display screens but which are not connected to a computer or network.

To reiterate, many additional aspects, modifications and variations are also contemplated and are intended to be encompassed within the scope of the following claims. Moreover, it should be understood that in the following claims actions are not necessarily performed in the particular sequence in which they are set out.

What is claimed is:

1. A method for creating multiple segments of information for presentation on a device having a limited size display screen, the method comprising:
   generating a first derivative style sheet file from a first copy of a master style sheet file, wherein the master style sheet file specifies, as a set of attributes, a certain portion of source information for presenting on a certain display screen, wherein the set of attributes exceeds an amount of information capable of being displayed by the limited size display screen in a single view, and wherein generating the first derivative style sheet file includes:
      deleting ones of the attributes from the first copy of the master style sheet file, so that the first copy of the master style sheet file has a first subset of the attributes specifying a first segment of the source information:
   generating at least a second derivative style sheet file from at least a second copy of the master style sheet file, including:
      deleting ones of the attributes from the at least second copy of the master style sheet file so that the at least second copy of the master style sheet file has a second subset of the attributes specifying at least a second segment of the source information;
   generating first presentation material, in response to the source information and the first derivative style sheet file, for presenting as a first view on the limited size display screen for a first segment of the certain source information; and
   generating at least second presentation material, in response to the source information and the at least second derivative style sheet file, for presenting as at least a second view on the limited size display screen for at least a second segment of the certain source information, wherein the first and at least second views together present all of the certain portion of source information on the limited size display screen, instead of presenting the certain portion on the certain, larger display screen.

2. The method of claim 1, wherein generating the respective derivative style sheets comprises adding link attributes to the respective derivative style sheets such that links are included in the presentation materials for navigating among the respective views.

3. The method of claim 1, wherein the first subset of attributes and the second subset of attributes have at least one common attribute.

4. The method of claim 1, wherein at least one of the source information attributes is excluded from the first subset of attributes and included in the second subset of attributes, and at least one of the source information attributes is excluded from the second subset of attributes and included in the first subset of attributes.

5. A computer system comprising:
   a processor; and
   a memory coupled to the processor, wherein the memory is enabled to store program instructions, wherein the processor is operable to execute the program instructions for:
      generating a first derivative style sheet file from a first copy of a master style sheet file, wherein the master style sheet file specifies, as a set of attributes, a certain portion of source information for presenting on a certain display screen, wherein the set of attributes exceeds an amount of information capable of being displayed by the limited size display screen in a single view, and wherein generating the first derivative style sheet file includes:
         deleting ones of the attributes from the first copy of the master style sheet file so that the first copy of the master style sheet file has a first subset or the attributes specifying a first of the source information;
      generating a second derivative style sheet file from a second copy of the master style sheet file, including:
         deleting ones of the attributes from the second copy of the master style sheet file so that the second copy of the master style sheet file has a second subset of the attributes specifying a second segment of the source information;
      generating first presentation material, in response to the source information and the first derivative style sheet file, for presenting as a first view on the limited size display screen for a first segment of the certain source information; and
      generating second presentation material, in response to the source information and the second derivative style sheet file, for presenting as a second view on the limited size display screen for a second segment of the certain source information.

6. The system of claim 5, wherein generating the respective derivative style sheets comprises adding link attributes to the respective derivative style sheets such that links are included in the presentation materials for navigating among the respective views.

7. The system of claim 5, wherein the first subset of attributes and the second subset of attributes have at least one common attribute.

8. The system of claim 5, wherein at least one of the source information attributes is excluded from the first subset of attributes and included in the second subset of attributes, and at least one of the source information attributes is excluded from the second subset of attributes and included in the first subset of attributes.

9. A computer program product, for creating multiple segments of information for presentation on a device having a limited size display screen, the computer program product having program logic on a computer readable storage media for causing a computer system to perform:

generating a first derivative style sheet file from a first copy of a master style sheet file, wherein the master style sheet file specifies, as a set of attributes, a certain portion of source information for presenting on a certain display screen, wherein the set of attributes exceeds an amount of information capable of being displayed by the limited size display screen in a single view, and wherein generating the first derivative style sheet file includes:

deleting ones of the attributes from the first copy of the master style sheet file, so that the first copy of the master style sheet file has a first subset of the attributes specifying a first segment of the source information;

generating a second derivative style sheet file from a second copy of the master style sheet file, including:

deleting ones of the attributes from the second copy of the master style sheet file so that the second copy of the master style sheet file has a second subset of the attributes specifying a second segment of the source information;

generating first presentation material, in response to the source information and the first derivative style sheet file, for presenting as a first view on the limited size display screen for a first segment of the certain source information; and generating second presentation material, in response to the source information and the second derivative style sheet file, for presenting as a second view on the limited size display screen for a second segment of the certain source information.

10. The computer program product of claim 9, wherein generating the respective derivative style sheets comprises adding link attributes to the respective derivative style sheets such that links are included in the presentation materials for navigating among the respective views.

11. The computer program product of claim 9, wherein the first subset of attributes and the second subset of attributes have at least one common attribute.

12. The computer program product of claim 9, wherein at least one of the source information attributes is excluded from the first subset of attributes and included in the second subset of attributes, and at least one of the source information attributes is excluded from the second subset of attributes and included in the first subset of attributes.

* * * * *